(12) United States Patent
Endo

(10) Patent No.: US 7,206,126 B2
(45) Date of Patent: Apr. 17, 2007

(54) OPTICAL SYSTEM, AND IMAGE PICK-UP APPARATUS USING THE SAME

(75) Inventor: Hiroshi Endo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 11/039,785

(22) Filed: Jan. 24, 2005

(65) Prior Publication Data

US 2005/0168807 A1 Aug. 4, 2005

(30) Foreign Application Priority Data

Jan. 30, 2004 (JP) ............................. 2004-022745

(51) Int. Cl.
*G02B 9/20* (2006.01)
*F21V 9/06* (2006.01)
(52) U.S. Cl. ..................... 359/361; 359/354; 359/581; 359/569
(58) Field of Classification Search ................ 359/354, 359/361, 569, 581
See application file for complete search history.

(56) References Cited

U.S. PATENT DOCUMENTS

| 5,044,706 | A | 9/1991 | Chen | 359/357 |
|---|---|---|---|---|
| 5,585,969 | A | 12/1996 | Endo | 359/683 |
| 5,790,321 | A | 8/1998 | Goto | 359/742 |
| 5,978,153 | A | 11/1999 | Nishio | 359/690 |
| 6,124,972 | A * | 9/2000 | Hayakawa et al. | 359/557 |
| 6,522,464 | B2 | 2/2003 | Kuwabara et al. | 359/361 |
| 6,671,104 | B2 | 12/2003 | Endo | 359/691 |
| 2004/0080632 | A1* | 4/2004 | Iwasawa et al. | 348/240.3 |

FOREIGN PATENT DOCUMENTS

| JP | 4-213421 | 8/1992 |
|---|---|---|
| JP | 6-324262 | 11/1994 |
| JP | 11-133305 | 5/1999 |
| JP | 2001-264526 | 9/2001 |

* cited by examiner

*Primary Examiner*—Drew A. Dunn
*Assistant Examiner*—Joshua L. Pritchett
(74) *Attorney, Agent, or Firm*—Fitzpatrick, Cella, Harper & Scinto

(57) ABSTRACT

An optical system including a diffractive optical element, and an optical member for suppressing incidence of ultraviolet radiation on the diffractive optical element is disclosed. The optical member is disposed on a light incident side of the diffractive optical element. The optical member has optical power to achieve an optical system that has high optical performance and preferable environmental durability.

13 Claims, 6 Drawing Sheets

OPTICAL SYSTEM, AND IMAGE PICK-UP APPARATUS USING THE SAME

BACKGROUND OF THE INVENTION

1. Field of the Invention

The present invention relates to an optical system, and particularly to an optical system preferably usable in a variety of apparatuses, such as a digital camera, a video camera, a film camera, a binocular, a projector, a telescope, a microscope, and a copying machine.

2. Related Background Art

Conventionally, a method of combining lenses made of glass materials having different dispersions has been employed to correct chromatic aberrations of an optical system. In contrast to such a method of reducing chromatic aberration by the combination of glass materials, known is a method of reducing chromatic aberration by using a diffractive optical element (DOE) having a function of diffraction in an optical system (see Japanese Patent Application Laid-Open No. H04-213421 (corresponding to U.S. Pat. No. 5,044,706), and Japanese Patent Application Laid-Open No. H06-324262 (corresponding to U.S. Pat. No. 5,790,321).

For example, the following optical system is known as an optical system using a diffractive optical element. The optical system is a zoom lens including a first lens unit having positive refractive power, a second lens unit having negative refractive power, and following lens unit(s) in order from an object side to an image side, and the first lens unit is provided with a diffractive optical element (see Japanese Patent Application Laid-Open No. H11-133305 (corresponding to U.S. Pat. No. 5,978,153).

Further, in a diffractive optical element including a diffraction grating formed of a material having a low ultraviolet-radiation resisting characteristic, known is a diffractive optical element having a light blocking means for blocking or screening ultraviolet radiation, such as an ultraviolet-radiation cut filter, disposed on a incident light receiving side (see Japanese Patent Application Laid-Open No. 2001-264526 (corresponding to U.S. Pat. No. 6,522,464).

Further, known is a lens system in which a protective glass is disposed on a most object side of a telescopic lens, and a coating (ultraviolet-radiation blocking means) for blocking ultraviolet radiation is formed on a lens surface of the protective glass.

Generally, a small-sized total structure of an optical system and an enhanced optical performance are required for an optical system such as a shooting lens.

Furthermore, an optical apparatus (an image pick-up apparatus) to be used in a variety of environments, such as outdoors and indoors, must satisfy a sufficient environmental durability. Therefore, if a diffractive optical element is made of a material having a low ultraviolet-radiation resisting characteristic, ultraviolet-radiation blocking means for protecting the diffractive optical element from ultraviolet radiation and the like must be disposed at an appropriate location in an optical system. Unless such a blocking means is disposed, optical performance of the diffractive optical element is likely to deteriorate, leading to a decrease in optical performance of the entire optical system.

SUMMARY OF THE INVENTION

The object of the present invention is to provide an optical system that has a high optical performance and a preferable environmental durability while including a diffractive optical element.

In one aspect of the present invention, an optical system includes a diffractive optical element, and an optical member for suppressing incidence of ultraviolet radiation on the diffractive optical element, which is disposed on an incident light receiving side of the diffractive optical element, and has an appropriate optical power. Specifically, a condition of $0.1<|fu/f|<2$ is satisfied, where fu and f represent focal lengths of the optical member and the entire system, respectively.

These and further aspects and features of the invention will become apparent from the following detailed description of preferred embodiments thereof in conjunction with the accompanying drawings.

DETAILED DESCRIPTION OF THE PREFERRED EMBODIMENTS

Embodiments of an optical system and an image pick-up apparatus using the optical system of the present invention will hereinafter be described with reference to the drawings.

Figure 1:
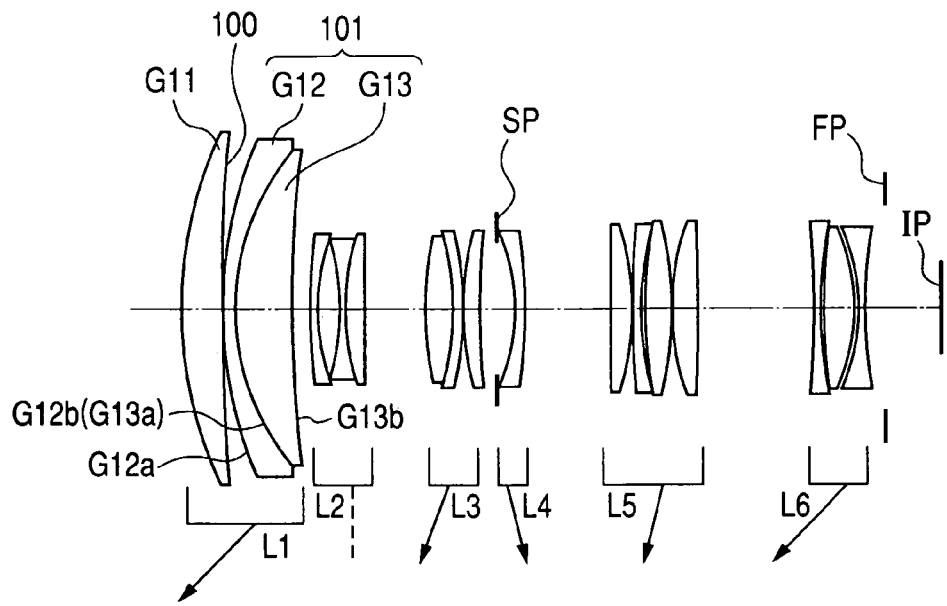
FIG. 1 is a lens cross-sectional view illustrating a first embodiment according to the present invention.
Figure 2:
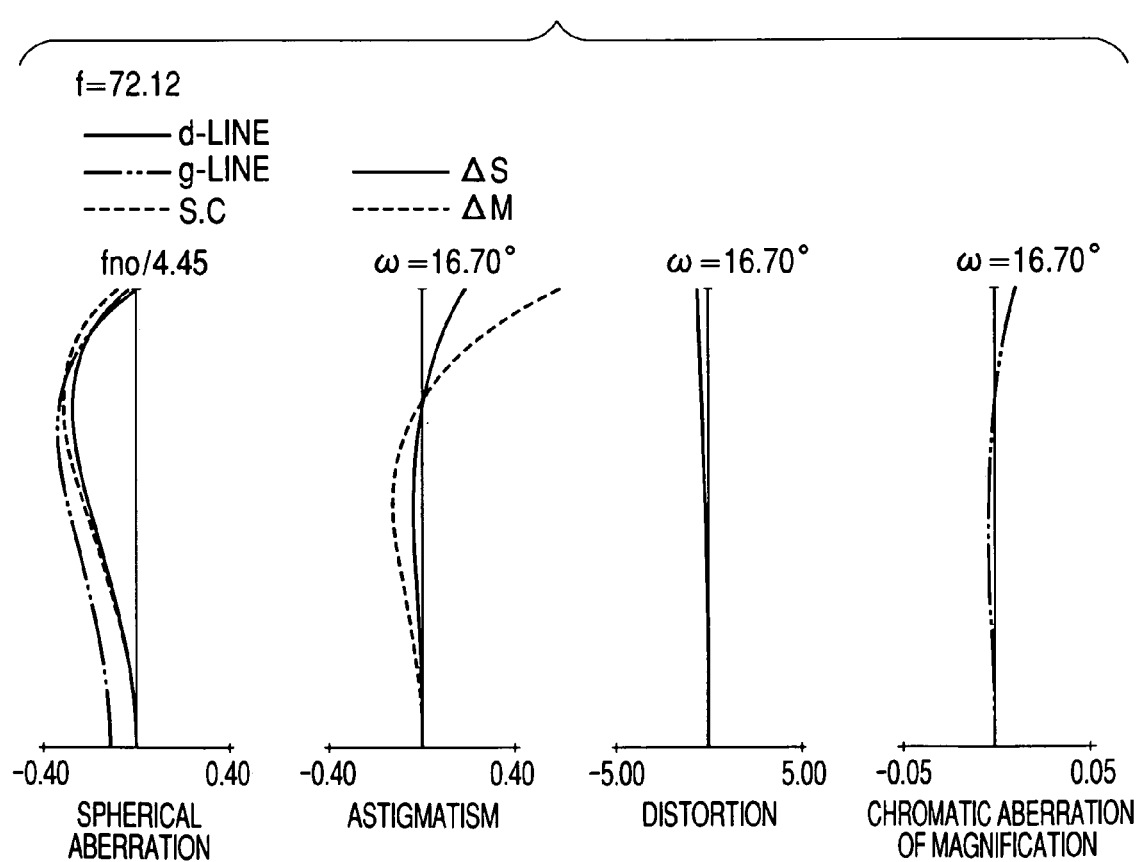
FIG. 2 is a view illustrating aberration charts of the first embodiment at its wide-angle end.
Figure 3:
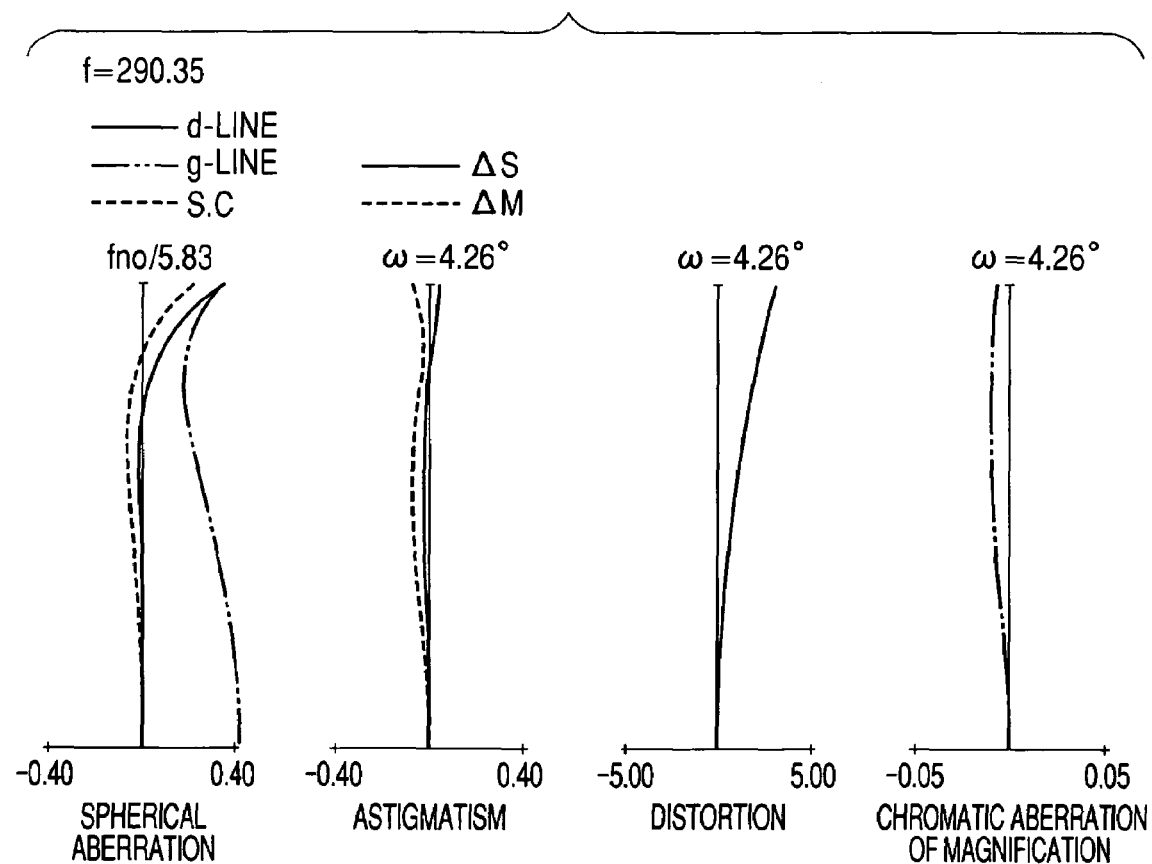
FIG. 3 is a view illustrating aberration charts of the first embodiment at its telephoto end.

FIG. 1 is a lens cross-sectional view illustrating an optical system of a first embodiment according to the present invention. In FIG. 1, a zoom lens is at its wide-angle end. FIGS. 2 and 3 are views illustrating aberration charts of the zoom lens of the first embodiment at its wide-angle end and telephoto end, respectively.

The zoom lens of the first embodiment is a shooting lens system to be used in an image pick-up apparatus. In the lens cross-sectional view of FIG. 1, its left side is an object side (a front side), and its right side is an image side (a rear side).

In the lens cross-sectional view of FIG. 1, L1 represents a first lens unit having positive refractive power (optical power is equal to a reciprocal of a focal length), L2 represents a second lens unit having negative refractive power, L3 represents a third lens unit having positive refractive power, L4 represents a fourth lens unit having negative refractive power, L5 represents a fifth lens unit having positive refractive power, and L6 represents a sixth lens unit having negative refractive power. SP designates an aperture stop, and the aperture stop SP is disposed on an object side of the fourth lens unit L4. FP designates a flare cut stop, and IP designates an image plane, which corresponds to an image pick-up plane of a solid-state pick-up device (a photoelectric transducer), such as a CCD sensor and a CMOS sensor when the zoom lens is used as a shooting optical system in a video camera or a digital still camera, and corresponds to an ordinary-film plane in the case of a silver-halide film camera.

Arrows designate moving loci of respective lens units during zooming operations from the wide-angle end to the telephoto end, respectively. Dotted line indicates that the lens unit remains stationary (i.e., does not move for zooming) relative to the image plane IP during the zooming operation. Reference numeral 101 represents a diffractive optical element, which is provided with a diffractive optical portion made of ultraviolet-radiation curing resin formed on a cemented lens surface between a lens G12 and a lens G13. The diffractive optical element 101 is thus constituted by a cemented lens. Reference numeral 100 represents light blocking means provided with a coating having a function of blocking or screening ultraviolet radiation. Reference numeral G11 represents an optical member (a lens) in which the light blocking means 100 is formed on a lens substrate.

In aberration charts, d and g designate a d-line and a g-line, respectively, S.C designates a sine condition, and $\Delta M$ and $\Delta S$ designate a meridional image plane and a sagittal image plane. The chromatic aberration of magnification is represented by the g-line.

The optical system of the first embodiment is an optical system in which a plurality of lenses, an optical member G11 provided with light blocking means 100 for blocking ultraviolet radiation formed on its light incident surface or/and its light emerging surface, and a diffractive optical element 101 are disposed along its optical path. The light blocking means 100 is disposed on the light incident side of a diffractive optical portion of the diffractive optical element 101, apart therefrom by air, or cemented thereon by adhesive. Further, a condition, $$0.1 < |fu|/f < 2 \quad (1),$$

is satisfied, where fu represents focal length of the optical member G11 and f represents focal length of the entire system. And now, f represents focal length at the telephoto end in the case of a zoom lens.

It is thereby possible to obtain an optical system, which includes a diffractive optical element, in which chromatic aberration is preferably corrected and high optical performance and preferable environmental durability are achieved.

Particularly, by providing the optical member G11 having the light blocking means 100 with refractive power satisfying the condition (1), ultraviolet radiation can be cut and a predetermined refractive power is shared by the optical member G11 without using an optical member such as a planar plate having no refractive power, and aberrations of the entire optical system can be preferably corrected.

More preferably, a numerical range of the condition (1) is set as $$0.3 < |fu|/f < 1.8 \quad (1a)$$

The diffractive optical element 101 is configured by forming ultraviolet-radiation curing resin on a surface of a substrate glass composed of a lens.

The light blocking means 100 is formed on a substrate different from the substrate glass constituting the diffractive optical element 101.

In the first embodiment, the diffractive optical element 101 is disposed apart from the optical member 100 provided with the light blocking means, with an air therebetween. It is, however, possible to bond the diffractive optical element 101 and the optical member 100 by adhesive, as described in a second embodiment (described later).

Further, a condition (2), $$10 < |fd|/f < 100 \quad (2),$$

is satisfied, where fd represents a focal length of a diffraction function of a diffractive optical portion of the diffractive optical element 101.

The condition (2) defines a ratio of the focal length of the diffracting function of the diffractive optical portion of the diffractive optical element relative to the focal length (the focal length at the telephoto end in the case of a zoom lens) of the entire lens system, and is a relation for achieving preferable correction of the chromatic aberration by the diffracting function.

When the refractive power by the diffraction increases so that $|fd|/f$ decreases beyond the lower limit of the condition (2), the chromatic aberration is too strongly corrected by the diffraction and the chromatic correction in the entire lens system is likely to be inversely degraded. On the other hand, when the refractive power by the diffraction decreases so that $|fd|/f$ increases beyond the upper limit of the condition (2), correction of the chromatic aberration by the diffraction undesirably lowers.

Still more preferably, a numerical range of the condition (2) is set as $$15 < |fd|/f < 70 \quad (2a).$$

In the first embodiment, on-axis chromatic aberration and chromatic aberration of magnification can be effectively corrected by using the diffractive optical element 101 in the first lens unit L1 in which incident heights of both on-axis and off-axis light beams thereon are highest, i.e., a distance between the outermost light beam of a light beam imaged at an arbitrary image height and optical-axial center is longest.

Characteristics of the diffractive optical portion of the diffractive optical element 101 will be described. -The diffractive optical element has optical characteristics that are different from refraction by a conventional glass. In other words, the diffractive optical element has characteristics of negative dispersion and extraordinary dispersion. More specifically, when Abbe number νd and partial dispersion ratio θgF are represented by $$\nu d = (nd-1)/(nF-nC)$$

$$\theta gF = (ng-nF)/(nF-nC)$$

where ng, nd, nF and nC represent refractive indexes of material in g-line, d-line, F-line and C-line, respectively, $$\nu d = -3.45, \text{ and } \theta gF = 0.296.$$

In the present invention, chromatic aberration of an optical system (a zoom lens) is preferably corrected by using those characteristics of the diffractive optical element.

It is possible to configure the diffractive optical element so as to achieve an effect of an aspherical surface by changing the pitch of a diffraction grating constituting the diffractive optical element.

The diffractive optical element 101 of the first embodiment is formed by a method (a so-called replica) in which a layer (a diffraction grating) of ultraviolet-radiation curing resin is attached as a diffractive optical portion on an optical surface (a planar surface, a spherical surface, or an aspherical surface) of an optical substrate. When forming the diffraction grating made of ultraviolet-radiation curing resin on a surface, ultraviolet radiation is applied from the other lens surface opposite to the surface on which the diffraction grating is to be formed.

It is therefore desirable that a material of the lens serving as the substrate has a high ultraviolet-radiation transmittance, and a coating with a high ultraviolet-radiation transmittance is formed on a surface of the lens opposite to a surface on which the diffraction grating is to be formed. Since the ultraviolet-radiation transmittance of the substrate lens is thus enhanced, a curing time of the resin can be shortened. Accordingly, its fabrication becomes easy to perform, and it is possible to reduce disadvantages of mal-curing of the resin, poor surface precision of the diffraction grating, and the like.

On the other hand, ultraviolet-radiation curing resins include a kind of resin whose ultraviolet-radiation resisting characteristic after hardened is weak. Therefore, a lens G11 in which ultraviolet-radiation cutting coating (a light blocking means) 100 is formed on an object side, i.e., an light incident side, of the diffractive optical element 101, as a member separate from lenses G12 and G13 constituting the diffractive optical element 101.

In the first embodiment, the lenses G12 and G13 are cemented on each other, and a diffractive optical portion composed of a single-layer or multi-layer diffraction grating is formed on at least one of lens surfaces G12b and G13a to be cemented. When the diffractive optical portion is formed on one of the lens surfaces G12b and G13a only, it is preferable to form an antireflection coat (an antireflection film) by vapor deposition or the like on a surface having no diffractive optical portion thereon.

In a conventional lens system, since ultraviolet-radiation cut coat is constituted as a protective filter having almost no refractive power, there have been disadvantages of increase in the number of lenses, increase in the total lens length, and the like. In the first embodiment, the ultraviolet-radiation cut coat 100 is provided on the eleventh lens G11 that is significant in optical performance (i.e., has refractive power), so that there are no disadvantages of increase in the total lens length and increase in complication of the lens system. Further, the ultraviolet-radiation cut coat has a multi-layer structure that also functions as antireflection coating for a visible light range.

Optical systems of second, third and fourth embodiments will now be described. In the second, third and fourth embodiments, the present invention is applied to a zoom lens different type from that of the first embodiment.

Figure 4:
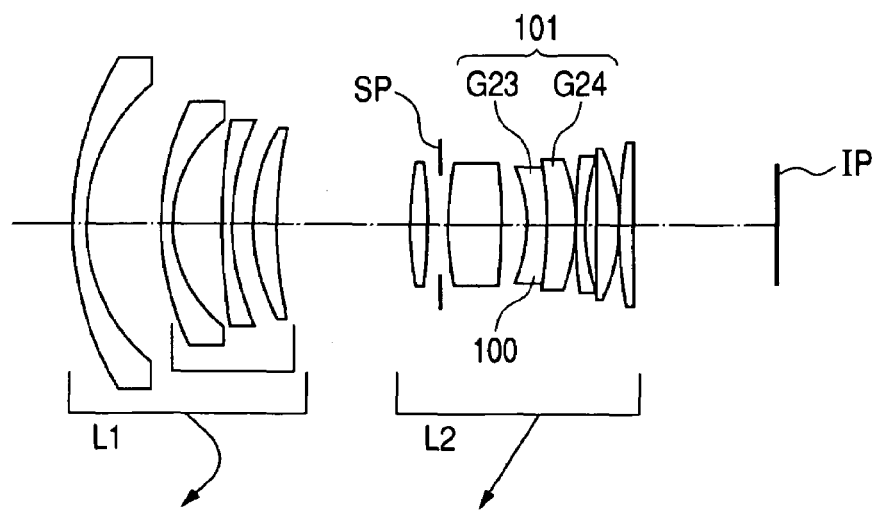
FIG. 4 is a lens cross-sectional view illustrating a second embodiment according to the present invention.

FIG. 4 is a lens cross-sectional view illustrating an optical system of the second embodiment according to the present invention. In FIG. 4, a zoom lens is at its wide-angle end.

In the lens cross-sectional view of FIG. 4, L1 represents a first lens unit having negative refractive power, and L2 represents a second lens unit having positive refractive power. While an interval between lens units L1 and L2 is reduced, zooming from the wide-angle end to the telephoto end is performed by moving the lens units L1 and L2 toward an object side as indicated by arrows.

SP designates an aperture stop. The aperture stop SP moves integrally with the second lens unit L2 during zooming. IP designates an image plane.

In the second embodiment, a diffractive optical element 101 is constituted by forming a diffraction grating made of ultraviolet-radiation curing resin on an image-side lens surface of a lens G24 constituting the second lens unit L2. Further, ultraviolet-radiation cut coat 100 is formed on an object-side lens surface of a lens G23 which constitutes the second lens unit L2 and is disposed on a light incident side of the lens G24. The lenses G24 and G23 are cemented on each other subsequent to establishment of the above functions. Also in the second embodiment, a light blocking means 100 for blocking ultraviolet radiation is provided without adding a new optical member.

Figure 5:
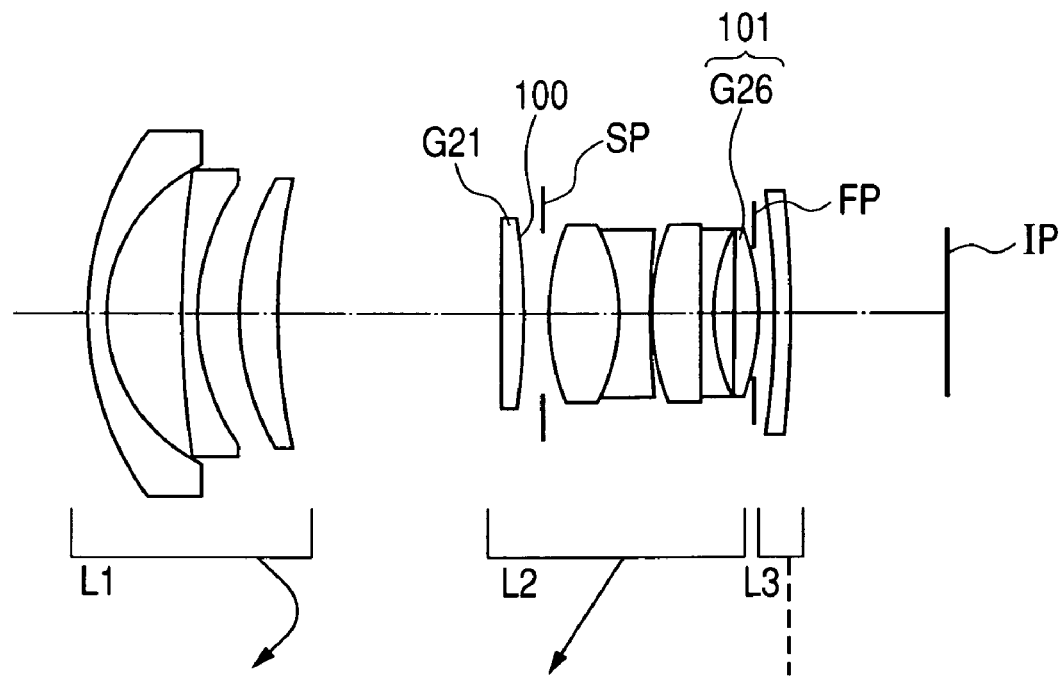
FIG. 5 is a lens cross-sectional view illustrating a third embodiment according to the present invention.

FIG. 5 is a lens cross-sectional view illustrating an optical system of the third embodiment according to the present invention. In FIG. 5, a zoom lens is at its wide-angle end.

In the lens cross-sectional view of FIG. 5, L1 represents a first lens unit having negative refractive power, L2 represents a second lens unit having positive refractive power, and L3 represents a third lens unit having negative refractive power. SP designates a stop. IP designates an image plane. FP designates a flare cut stop.

In the zoom lens of the third embodiment, the first and second lens units L1 and L2 are moved toward an object side as indicated by arrows during zooming from the wide-angle end to the telephoto end.

In the third embodiment, a diffractive optical element 101 is constituted by forming a diffraction grating made of ultraviolet-radiation curing resin on an image-side lens surface of a lens G26 constituting the second lens unit L2. Further, a light blocking means 100 composed of ultraviolet-radiation cut coat is formed on an object-side lens surface of a lens G21 which constitutes the second lens unit L2 and is disposed on an light incident side of the lens G26.

Figure 6:
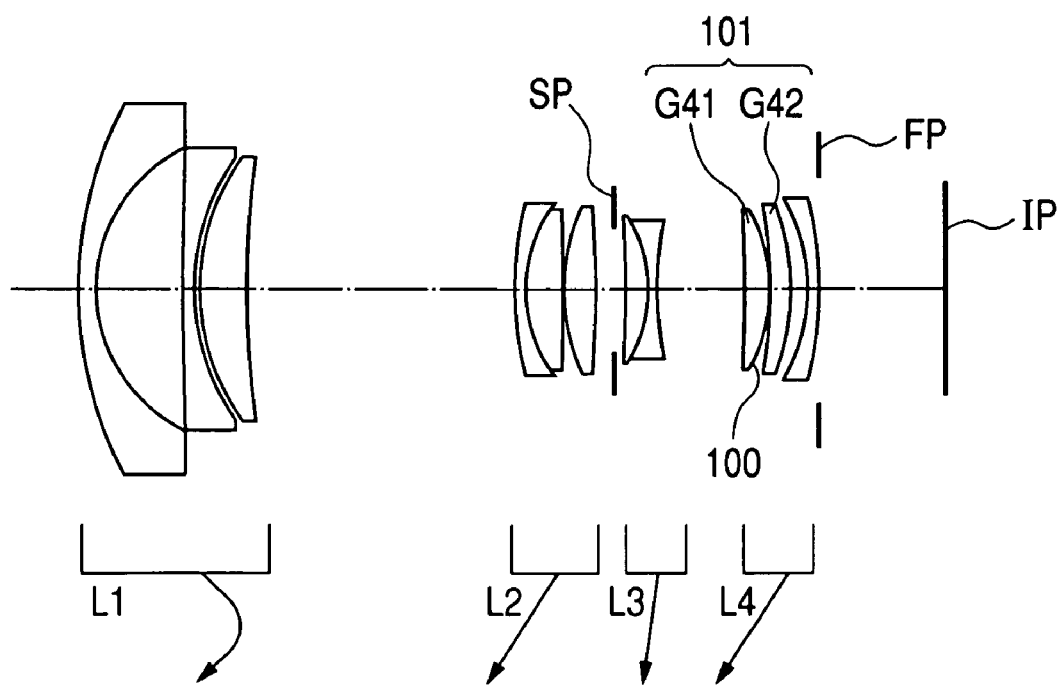
FIG. 6 is a lens cross-sectional view illustrating a fourth embodiment according to the present invention.

FIG. 6 is a lens cross-sectional view illustrating an optical system of the fourth embodiment according to the present invention. In FIG. 6, a zoom lens is at its wide-angle end.

In the lens cross-sectional view of FIG. 6, L1 represents a first lens unit having negative refractive power, L2 represents a second lens unit having positive refractive power, L3 represents a third lens unit having negative refractive power, and L4 represents a fourth lens unit having positive refractive power. SP designates an aperture stop. The aperture stop SP is disposed in front of the third lens unit L3, and moves integrally with the third lens unit L3 during zooming. IP designates an image plane. FP designates a flare cut stop. The first, second, third and fourth lens units L1, L2, L3 and L4 are moved as indicated by arrows during zooming from the wide-angle end to a zoom position at the telephoto end.

In the fourth embodiment, a diffractive optical element 101 is constituted by forming a diffraction grating of ultraviolet-radiation curing resin on an image-side lens surface of a lens G42 constituting the fourth lens unit L4. Similarly, a light blocking means 100 composed of ultraviolet-radiation cut coat is formed on an image-side lens surface of a lens G41 constituting the fourth lens unit L4 and disposed on an light incident side of the lens G42.

Description will now be given to constructions of diffractive optical elements used in the optical systems of the first, second, third and fourth embodiments, respectively.

Figure 7:
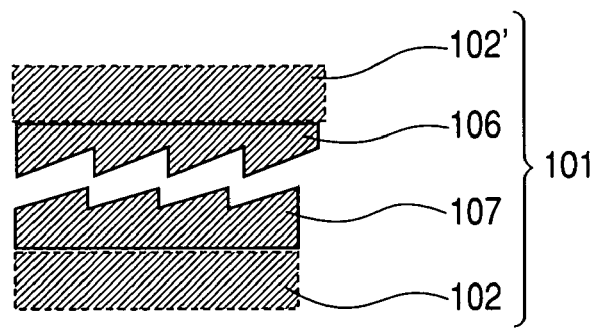
FIG. 7 is a view illustrating a diffractive optical element according to the present invention.
Figure 9:
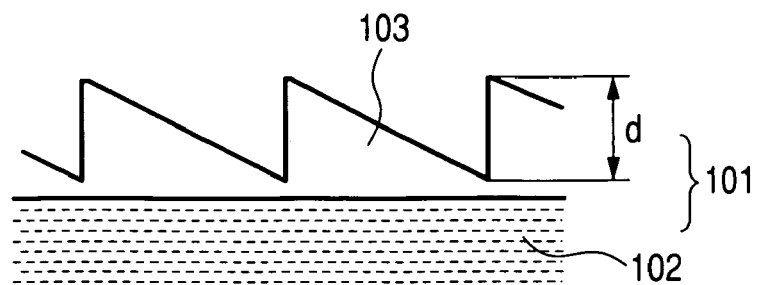
FIG. 9 is a view illustrating a diffractive optical element according to the present invention.
Figure 11:
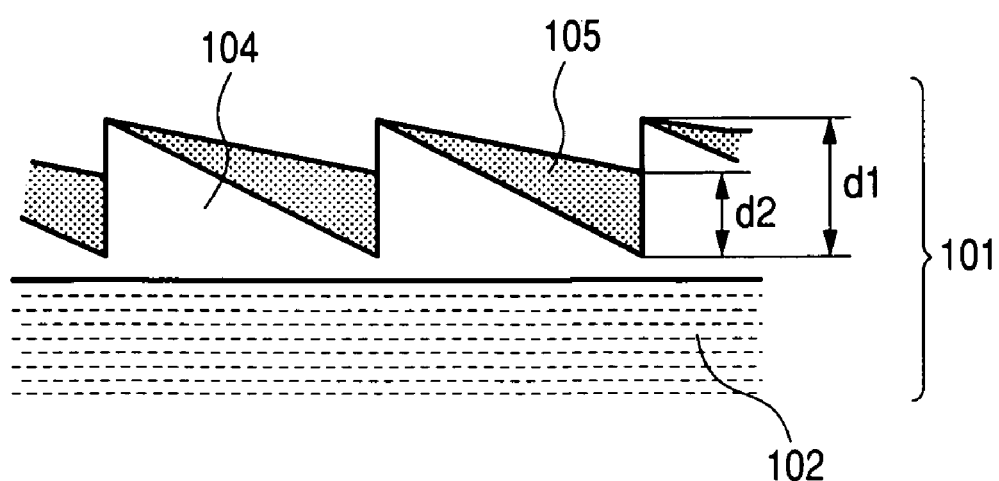
FIG. 11 is a view illustrating a diffractive optical element according to the present invention.

With respect to the configuration of a diffractive optical portion of the diffractive optical element 101, the following configurations can be selectively applied, for example, a two-layer structure of diffraction gratings 106 and 107 sandwiching an air gap (an air stratum) as illustrated in FIG. 7, a single-layer structure 103 shaped into a single-layer kinoform as illustrated in FIG. 9, and a two-layer structure in which two layers of different (or same) grating thicknesses are layered as illustrated in FIG. 11.

Figure 8:
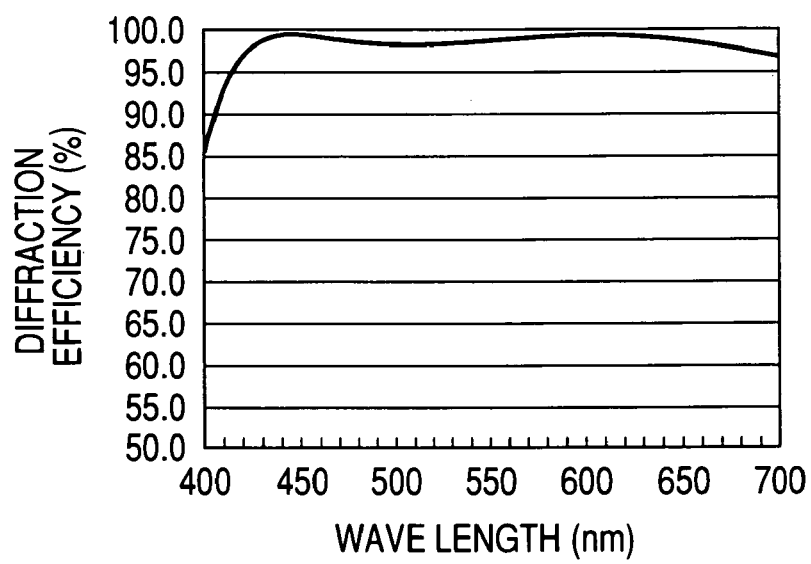
FIG. 8 is a graph illustrating a wavelength dependency characteristic of a diffractive optical element according to the present invention.

In FIG. 7, a first diffraction grating 107 made of ultraviolet-radiation curing resin is formed on a substrate (a lens) 102, and a second diffraction grating 106 made of ultraviolet-radiation curing resin is formed on a substrate (a lens) 102' to constitute the diffractive optical element 101. FIG. 8 shows a wavelength dependency characteristic of diffraction efficiency of first-order diffraction light diffracted by the diffractive optical element 101 illustrated in FIG. 7. As can be understood from FIG. 8, the diffraction efficiency in a design order exhibits high diffraction efficiency not less than 95% in the overall range of wavelengths used.

Figure 10:
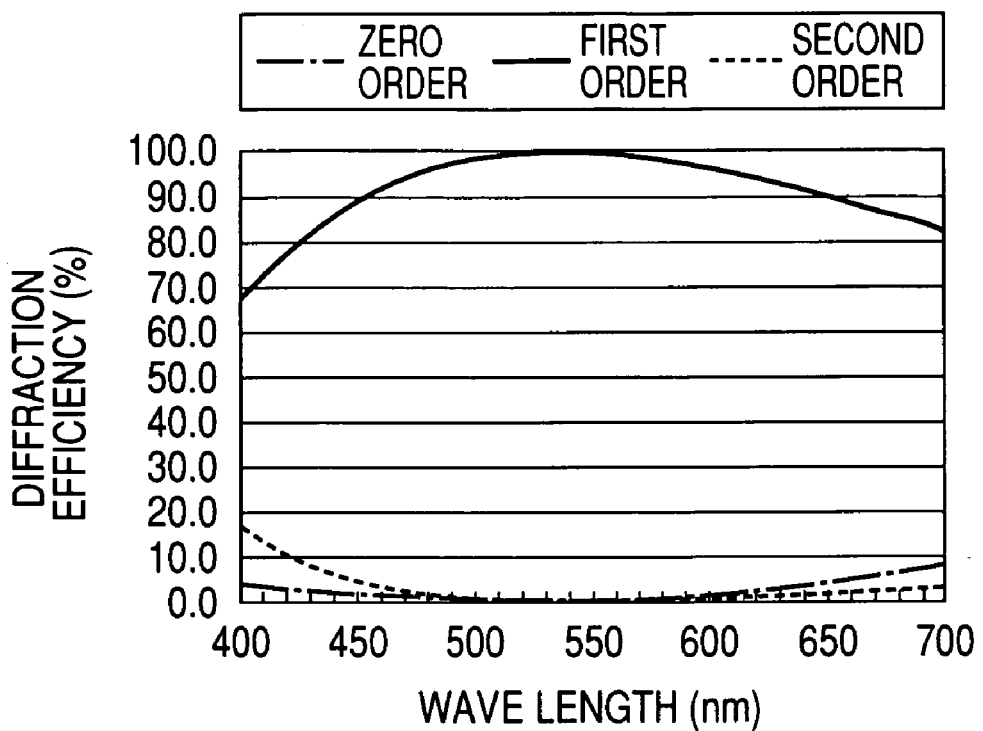
FIG. 10 is a graph illustrating a wavelength dependency characteristic of a diffractive optical element according to the present invention.

FIG. 10 shows a wavelength dependency characteristic of diffraction efficiency of first-order diffraction light diffracted by the diffractive optical element 101 in which a single-layer diffraction grating 103 is formed on the substrate 102 as illustrated in FIG. 9. In an actual construction of the diffractive optical element, ultraviolet-radiation curing resin is applied on a surface of the substrate 102 to form the diffraction grating 103. Here, on the resin portion formed is the diffraction grating 103 whose thickness d is such that the diffraction efficiency of first-order diffraction light at a wavelength of 530 nm can be 100%.

As can be understood from FIG. 10, the diffraction efficiency in a design order decreases as the wavelength goes away from an optimum wavelength 530 nm. In contrast, diffraction efficiencies of diffraction light in zero and second orders near the design order increase as the wavelength goes away from the optimum wavelength 530 nm. Increase in diffraction light in orders other than the design order generates flare, leading to a decrease in resolution of the optical system.

Figure 12:
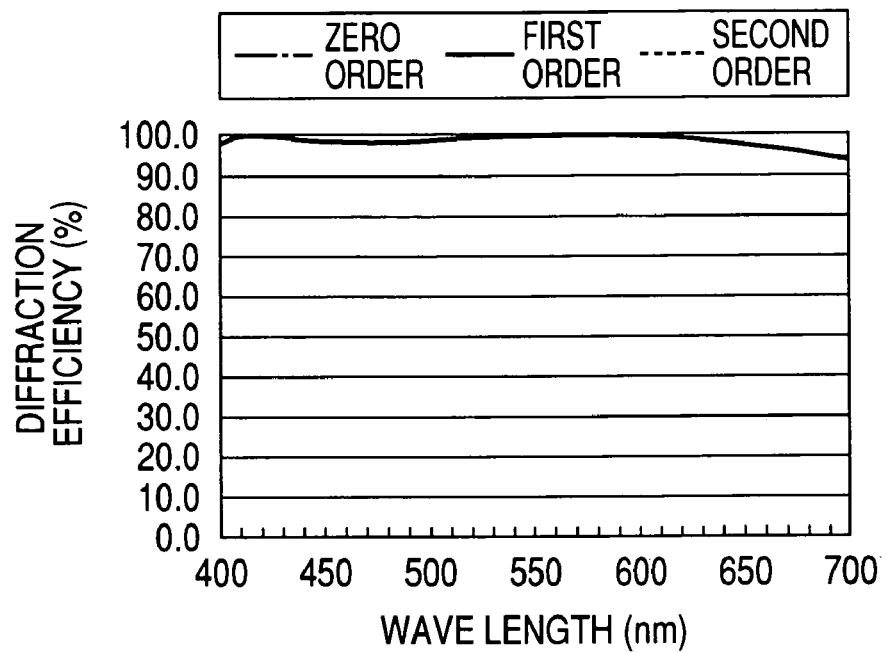
FIG. 12 is a graph illustrating a wavelength dependency characteristic of a diffractive optical element according to the present invention.

FIG. 12 shows a wavelength dependency characteristic of the diffraction efficiency in the first-order diffraction light diffracted by the diffractive optical element 101 illustrated in FIG. 11.

In FIG. 11, a first diffraction grating 104 made of ultraviolet-radiation curing resin (nd=1.499, vd=54) is formed on a substrate 102, and a second diffraction grating 105 made of another ultraviolet-radiation curing resin (nd=1.598, vd=28) is formed on the first diffraction grating 104 to construct the diffractive optical element 101. In this combination of materials, the grating thickness d1 of the first diffraction grating 104 is set as d1=13.8 μm, and the grating thickness d2 of the second diffraction grating 105 is set as d2=10.5 μm.

As can be seen from FIG. 12, when the diffractive optical element with a layered structure is employed, the diffraction efficiency in the design order has high diffraction efficiency over 95% in the overall range of wavelengths used.

In the first embodiment of the present invention, the diffractive optical element having the structure as illustrated in FIG. 7 is used. In the second, third and fourth embodiments of the present invention, the diffractive optical element having the structure as illustrated in FIG. 11 is used.

In the following, description will now be made to fourth numerical embodiments which correspond to the first to fourth embodiments, respectively. In each numerical embodiment, i designates the order of an optical surface from the object side, ri designates the radius of curvature of the i-th surface from the object side, di designates the lens thickness or the air gap between the i-th surface and the (i+1)-th surface from the object side, and ni and vi designate the refractive index and the Abbe number of material of the i-th optical member, respectively. Here, f, Fno and 2ω represent the focal length, the F-number, and the angle of view of the entire system at the time when focused on an infinite object, respectively.

The profile of the aspherical surface is written as $$X=(H^2/R)/\{1+[1-(1+K)(H/R)^2]^{1/2}\}+BH^4+CH^6+DH^8,$$

where, assuming that X-axis be a direction of the optical axis, H-axis be a direction perpendicular to the optical axis, and a positive direction is a direction in which light travels, R represents the paraxial radius of curvature, K represents the conic constant, and B, C and D represent aspherical coefficients, respectively.

In numerical values, the notation [e-Z] means [$10^{-Z}$]. The profile of the diffractive optical element is represented by $$\Phi(h)=2\pi\lambda o(C1\cdot h^2+C2\cdot h^4+C3\cdot h^6+\ldots)$$

where λo represents the reference wavelength (d-line), h represents the distance from the optical axis, and Φ(h) represents the phase.

Table 1 lists the relationship between each of the above-discussed conditions and numerical values in each of the numerical embodiments.

| First Numerical Embodiment | | | |
|---|---|---|---|
| f = 72.1~290.3 FNo = 1: 4.5~5.8 2ω = 33.4°~8.5° | | | |
| r1 = 60.908 | d1 = 5.86 | n1 = 1.51633 | v1 = 64.1 |
| r2 = 280.031 | d2 = 0.15 | | |
| r3 = 64.797 | d3 = 1.96 | n2 = 1.83400 | v2 = 37.2 |
| r4 = 36.828 | d4 = 8.18 | n3 = 1.48749 | v3 = 70.2 |
| (D.S.) | | | |
| r5 = 192.388 | d5 = variable | | |
| r6 = 93.113 | d6 = 0.98 | n4 = 1.71300 | v4 = 53.9 |
| r7 = 27.855 | d7 = 3.14 | | |
| r8 = −32.081 | d8 = 0.98 | n5 = 1.62299 | v5 = 58.2 |
| r9 = 37.125 | d9 = 2.75 | n6 = 1.84666 | v6 = 23.9 |
| r10 = 365.564 | d10 = variable | | |
| r11 = 51.834 | d11 = 4.01 | n7 = 1.51633 | v7 = 54.1 |
| r12 = −36.070 | d12 = 1.40 | n8 = 1.85026 | v8 = 32.3 |
| r13 = −50.761 | d13 = 0.15 | | |
| r14 = 42.383 | d14 = 2.35 | n9 = 1.48749 | v9 = 70.2 |
| r15 = 107.629 | d15 = 2.45 | | |
| r16 = ∞ (stop) | d16 = variable | | |
| r17 = −26.272 | d17 = 1.47 | n10 = 1.62041 | v10 = 60.3 |
| r18 = −79.945 | d18 = variable | | |
| r19 = 685.992 | d19 = 3.03 | n11 = 1.48749 | v11 = 70.2 |
| r20 = −41.776 | d20 = 0.11 | | |
| r21 = 153.703 | d21 = 1.12 | n12 = 1.34666 | v12 = 23.9 |
| r22 = 40.347 | d22 = 0.74 | | |
| r23 = 65.831 | d23 = 3.79 | n13 = 1.48749 | v13 = 70.2 |
| r24 = −54.646 | d24 = 0.11 | | |
| r25 = 37.622 | d25 = 3.67 | n14 = 1.61117 | v14 = 55.9 |
| r26 = −274.612 | d26 = variable | | |
| r27 = −168.885 | d27 = 0.95 | n15 = 1.86300 | v15 = 41.5 |
| r28 = 54.718 | d28 = 0.63 | | |
| r29 = 79.309 | d29 = 4.33 | n16 = 1.74077 | v16 = 27.8 |
| r30 = −32.040 | d30 = 0.70 | | |
| r31 = −30.590 | d31 = 0.95 | E17 = 1.78800 | v17 = 47.4 |
| r32 = 59.229 | d32 = variable | | |
| (asp.) | | | |
| r33 = ∞ | | | |
| (flare cut stop) | | | |

D.S. = diffraction surface
asp. = aspherical surface

F.L.

-continued

| V.G. | 72.12 | 128.05 | 290.35 |
|---|---|---|---|
| d5 | 2.74 | 32.81 | 62.24 |
| d10 | 9.43 | 6.27 | 1.92 |
| d16 | 3.79 | 7.83 | 13.82 |
| d18 | 12.89 | 7.86 | 1.86 |
| d26 | 17.29 | 14.33 | 1.82 |
| d32 | 3.00 | 9.12 | 25.99 |
| skinf | 38.88 | 38.88 | 38.88 |

F.L. = focal length
V.G. = variable gap phase coefficient of diffraction surface

| fourth surface | C1 | C2 | C3 |
|---|---|---|---|
| | −3.79247e−05 | −4.46511e−09 | −1.20977e−11 | aspherical coefficient

| | b | c | d |
|---|---|---|---|
| 32-nd surface | −4.073724e−07 | 1.007712e−09 | −1.454069e−11 |

Second Numerical Embodiment
f = 20.6~34.1 FNo = 1: 3.6~4.6 2ω = 92.8°~64.8°

| r1 = 41.822 | d1 = 1.70 | n1 = 1.78590 | ν1 = 44.2 |
|---|---|---|---|
| r2 = 22.118 (asp.) | d2 = variable | | |
| r3 = 35.618 | d3 = 1.40 | n2 = 1.80610 | ν2 = 41.0 |
| r4 = 17.434 | d4 = 6.46 | | |
| r5 = 83.209 | d5 = 1.30 | n3 = 1.77250 | ν3 = 49.6 |
| r6 = 32.124 | d6 = 2.80 | | |
| r7 = 26.403 | d7 = 3.00 | n4 = 1.84666 | ν4 = 23.8 |
| r8 = 57.299 | d8 = variable | | |
| r9 = 43.974 | d9 = 2.20 | n5 = 1.58313 | ν5 = 59.4 |
| r10 = −89.623 | d10 = 1.78 | | |
| r11 = ∞ (stop) | d11 = 0.92 | | |
| r12 = 37.832 | d12 = 6.90 | n6 = 1.62606 | ν6 = 39.2 |
| r13 = −86.527 | d13 = 3.50 | | |
| r14 = −19.067 | d14 = 2.50 | n7 = 1.84666 | ν7 = 23.8 |
| r15 = −75.790 | d15 = 3.80 | n8 = 1.78590 | ν8 = 44.2 |
| r16 = −25.448 (D.S.) | d16 = 0.20 | | |
| r17 = 90.929 | d17 = 1.20 | n9 = 1.83481 | ν9 = 42.7 |
| r18 = 25.064 | d18 = 1.37 | | |
| r19 = −1691.370 | d19 = 3.00 | n10 = 1.49700 | ν10 = 81.5 |
| r20 = −22.297 | d20 = 0.20 | | |
| r21 = 78.913 | d21 = 1.65 | n11 = 1.49700 | ν11 = 81.5 |
| r22 = 500.000 | | | | asp. = aspherical surface
D.S. = diffraction surface

| | F.L. | | |
|---|---|---|---|
| V.G. | 20.61 | 24.40 | 34.08 |
| d2 | 10.00 | 10.00 | 10.00 |
| d8 | 17.82 | 11.39 | 1.47 |
| skinf | 37.73 | 42.04 | 53.04 |

F.L. = focal length
V.G. = variable gap aspherical coefficient

| | b | c | d | e |
|---|---|---|---|---|
| second surface | −2.795684e−06 | −2.047829e−08 | 5.341714e−11 | −1.574307e−13 | phase coefficient of diffraction surface

| 16-th surface | C1 | C2 | C3 |
|---|---|---|---|
| | −5.32813e−04 | 1.07909e−06 | −8.8638e−09 |

Third Numerical Embodiment
f = 24.8~48.1 FNo = 1: 3.4~4.7 2ω = 82.1°~48.4°

| r1 = 32.064 | d1 = 1.71 | n1 = 1.83400 | ν1 = 37.2 |
|---|---|---|---|
| r2 = 16.399 | d2 = 7.75 | | |
| r3 = 101.626 | d3 = 1.44 | n2 = 1.71999 | ν2 = 50.2 |
| r4 = 23.540 | d4 = 0.07 | n3 = 1.52463 | ν3 = 47.9 |
| r5 = 19.934 (asp.) | d5 = 4.24 | | |
| r6 = 26.556 | d6 = 3.91 | n4 = 1.80518 | ν4 = 25.4 |
| r7 = 68.961 | d7 = variable | | |
| r8 = 147.799 | d8 = 2.40 | n5 = 1.62280 | ν5 = 57.0 |
| r9 = −72.137 | d9 = 1.90 | | |
| r10 = ∞ (stop) | d10 = 0.70 | | |
| r11 = 24.337 | d11 = 6.90 | n6 = 1.63930 | ν6 = 44.9 |
| r12 = −19.142 | d12 = 3.22 | n7 = 1.80610 | ν7 = 40.9 |
| r13 = 119.554 | d13 = 0.10 | | |
| r14 = 29.899 | d14 = 4.98 | n8 = 1.69680 | ν8 = 55.5 |
| r15 = −247.696 | d15 = 1.29 | n9 = 1.80518 | ν9 = 25.4 |
| r16 = 18.682 | d16 = 1.95 | | |
| r17 = −211.596 | d17 = 2.50 | n10 = 1.74950 | ν10 = 35.3 |
| r18 = −24.212 (D.S.) | d18 = variable | | |
| r19 = ∞ flare cut stop | d19 = variable | | |
| r20 = −73.818 | d20 = 1.55 | n11 = 1.51728 | ν11 = 69.6 |
| r21 = −108.244 | | | | asp. = aspherical surface
D.S. = diffraction surface

| | F.L. | | |
|---|---|---|---|
| V.G. | 24.83 | 28.01 | 48.10 |
| d7 | 22.78 | 17.70 | 1.12 |
| d18 | −0.50 | 0.13 | 4.15 |
| d19 | 2.20 | 4.25 | 17.20 |
| skinf | 37.78 | 37.78 | 37.78 |

F.L. = focal length
V.G. = variable gap aspherical coefficient

| | b | c | d | e |
|---|---|---|---|---|
| fifth-surface | −1.417717e−05 | −5.672184e−08 | 1.064934e−11 | −4.968765e−13 |

Phase coefficient of diffraction surface

| 18-th surface | C1 | C2 | C3 |
|---|---|---|---|
| | −3.77047e−04 | −1.52834e−07 | 4.19753e−09 |

Fourth Numerical Embodiment
f = 20.7~57.7 FNo = 1: 3.9~5.9 2ω = 92.4°~41.1°

| r1 = 43.973 | d1 = 1.70 | n1 = 1.83481 | ν1 = 42.7 |
|---|---|---|---|
| r2 = 16.768 | d2 = 8.93 | | |
| r3 = 284.531 | d3 = 1.40 | n2 = 1.77250 | ν2 = 49.6 |
| r4 = 21.349 (asp.) | d4 = 0.51 | | |
| r5 = 25.039 | d5 = 5.00 | n3 = 1.80518 | ν3 = 25.4 |
| r6 = 118.575 | d6 = variable | | |
| r7 = 39.888 | d7 = 1.10 | n4 = 1.84666 | ν4 = 23.8 |
| r8 = 15.073 | d8 = 4.10 | n5 = 1.56138 | ν5 = 45.2 |
| r9 = −119.000 | d9 = 0.14 | | |
| r10 = 22.375 | d10 = 3.20 | n6 = 1.71300 | ν6 = 53.9 |
| r11 = −100.986 | d11 = variable | | |
| r12 = ∞ (stop) | d12 = 1.20 | | |
| r13 = −58.782 | d13 = 2.20 | n7 = 1.78472 | ν7 = 25.7 |
| r14 = −14.943 | d14 = 1.00 | n8 = 1.77250 | ν8 = 49.6 |
| r15 = 39.728 | d15 = variable | | |
| r16 = −91.898 | d16 = 2.50 | n9 = 1.56384 | ν9 = 60.7 |
| r17 = −19.232 | d17 = 0.15 | | |
| r18 = −67.737 | d18 = 2.30 | n10 = 1.65160 | ν10 = 58.5 |
| r19 = −24.348 (D.S.) | d19 = 1.80 | | |
| r20 = −18.640 | d20 = 1.20 | n11 = 1.84666 | ν11 = 23.9 |
| r21 = −39.732 | d21 = variable | | |

-continued r22 = ∞ (asp.)
flare cut stop asp. = aspherical surface
D.S. = diffraction surface

| | F.L. | | |
|---|---|---|---|
| V.G. | 20.74 | 38.06 | 57.68 |
| d6 | 28.45 | 9.67 | 2.48 |
| d11 | 2.00 | 5.81 | 9.61 |
| d15 | 9.10 | 5.29 | 1.49 |
| d21 | 0.00 | 12.72 | 25.44 |
| skinf | 38.21 | 38.21 | 38.21 |

F.L. = focal length
V.G. = variable gap aspherical coefficient

| fourth-surface | b | c | d | e |
|---|---|---|---|---|
| | −1.649386e−05 | −3.382258e−08 | 6.094347e−11 | −4.196492e−13 |

| 21-st surface | b | c | d |
|---|---|---|---|
| | 1.132773e−05 | 5.025068e−08 | 2.865248e−10 | phase coefficient of diffraction surface

| 19-th surface | C1 | C2 | C3 |
|---|---|---|---|
| | −3.80284e−04 | −5.44838e−07 | −8.98684e−09 |

TABLE 1

Numerical Values of Conditions

| Condition | Lower Limit | Upper Limit | First Embodiment | Second Embodiment | Third Embodiment | Fourth Embodiment |
|---|---|---|---|---|---|---|
| 1 \|fd/f\| | 0.1 | 2.0 | 0.51 | 0.90 | 1.63 | 0.74 |
| 2 \|fu/f\| | 10 | 100 | 45 | 28 | 28 | 23 |

An embodiment directed to an image pick-up apparatus using an optical system in any of the first to fourth embodiments will be described with reference to FIG. 13.

Figure 13:
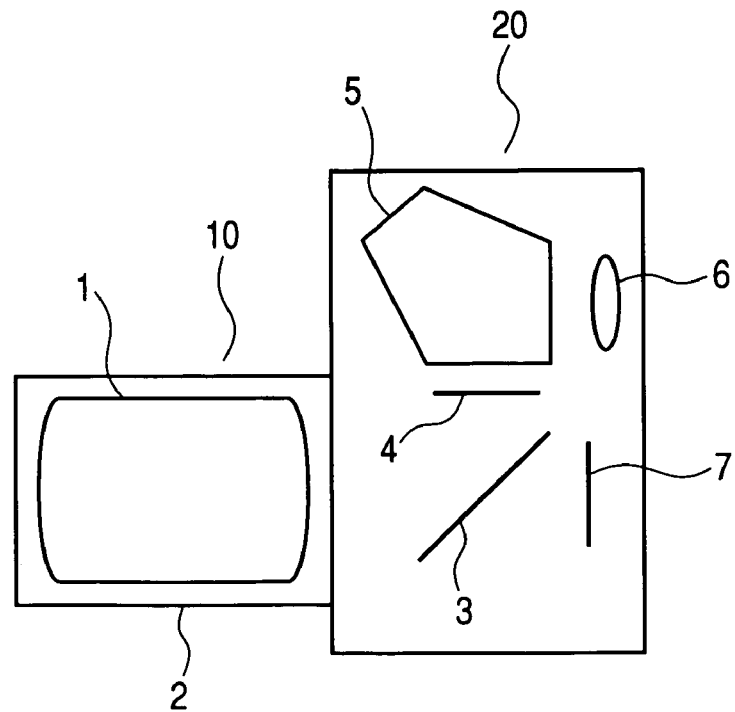
FIG. 13 is a schematic view illustrating a main portion of an image pick-up apparatus according to the present invention.

FIG. 13 is a schematic view illustrating a main portion of a single-lens reflex camera. In FIG. 13, reference numeral 10 designates a shooting lens including an optical system 1 of any of the first to fourth embodiments. The optical system 1 is held in a lens barrel 2 serving as a holding member. Reference numeral 20 designates a camera body. The camera body 20 is provided with a quick return mirror 3 for reflecting a light beam from the shooting lens 10 upward, a focal plane plate 4 disposed at an image-forming location of the shooting lens 10, a penta Dach prism 5 for converting an inverted image formed on the focal plane plate 4 into an erected image, an eyepiece 6 for observing the erected image, and the like. Reference numeral 7 designates a photosensitive surface. A solid-state image pick-up device (photoelectric transducer), such as a CCD sensor and a CMOS sensor, or an ordinary film is disposed at the photosensitive surface 7. At the time of photographing, the quick return mirror 3 is retracted from an optical path, and an image is formed on the photosensitive surface 7 by the shooting lens 10.

An optical apparatus as disclosed in this embodiment can effectively have technical advantages of the first to fourth embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-022745 filed on Jan. 30, 2004, which is hereby incorporated by reference herein.

What is claimed is:

1. An optical system comprising:
a diffractive optical element; and
an optical member for suppressing incidence of ultraviolet radiation on the diffractive optical element, the optical member being disposed on light incident side of the diffractive optical element,
wherein a conditional expression, $0.1 < |fu/f| < 2$, is satisfied, where fu and f represent focal lengths of the optical member and the entire optical system, respectively.

2. An optical system according to claim 1, wherein said optical member includes ultraviolet-radiation cut coating.

3. An optical system according to claim 1, wherein said diffractive optical element includes a diffraction grating made of ultraviolet-radiation curing resin.

4. An optical system according to claim 1, wherein said diffractive optical element and said optical member are spaced from each other with air therebetween.

5. An optical system according to claim 1, wherein said diffractive optical element and said optical member are cemented on each other.

6. An optical system according to claim 1, wherein a conditional expression, $10 < |fd/f| < 100$, is satisfied, where fd represents a focal length of diffraction function of said diffractive optical element.

7. An optical system according to claim 1,
wherein the optical system is a zoom lens including a plurality of lens units;
wherein each interval between the respective lens units is changed during zooming; and
wherein said diffractive optical element and said optical member are included in a lens unit.

8. An optical system according to claim 1,
wherein the optical system is a zoom lens including, in order from an object side to an image side, a first lens unit having positive optical power, a second lens unit having negative optical power, a third lens unit having positive optical power, a fourth lens unit having negative optical power, a fifth lens unit having positive optical power, and a sixth lens unit having negative optical power;

wherein each interval between the respective lens units is changed during zooming; and wherein said diffractive optical element and said optical member are included in the first lens unit.

9. An optical system according to claim 1, wherein the optical system is a zoom lens including, in order from an object side to an image side, a first lens unit having negative optical power, and a second lens unit having positive optical power;

wherein an interval between the respective lens units is changed during zooming; and wherein said diffractive optical element and said optical member are included in the second lens unit.

10. An optical system according to claim 1, wherein the optical system is a zoom lens including, in order from an object side to an image side, a first lens unit having negative optical power, a second lens unit having positive optical power, and a third lens unit having negative optical power;

wherein each interval between the respective lens units is changed during zooming; and wherein said diffractive optical element and said optical member are included in the second lens unit.

11. An optical system according to claim 1, wherein the optical system is a zoom lens including, in order from an object side to an image side, a first lens unit having negative optical power, a second lens unit having positive optical power, a third lens unit having negative optical power, and a fourth lens unit having positive optical power;

wherein each interval between the respective lens units is changed during zooming; and wherein said diffractive optical element and said optical member are included in the fourth lens unit.

12. An optical system according to claim 1, wherein the optical system forms an image on a solid-state pick-up device.

13. An image pick-up apparatus comprising:

an optical system according to claim 1; and a solid-state pick-up device for receiving an image formed by the optical system.

* * * * *

UNITED STATES PATENT AND TRADEMARK OFFICE
CERTIFICATE OF CORRECTION

PATENT NO. : 7,206,126 B2 Page 1 of 1
APPLICATION NO. : 11/039785
DATED : April 17, 2007
INVENTOR(S) : Hiroshi Endo It is certified that error appears in the above-identified patent and that said Letters Patent is hereby corrected as shown below:

COLUMN 1:
Line 41, "a" should read --an--.

COLUMN 5:
Line 33, "an light" should read --a light--.

COLUMN 6:
Line 40, "an light" should read --a light--.
Line 63, "an" should read --a--.

COLUMN 10:
Line 21, "d19 =     variable" should read --d19 = variable--.

Signed and Sealed this

Fourth Day of March, 2008

JON W. DUDAS
*Director of the United States Patent and Trademark Office*